US00RE46645E

(19) United States
(12) Reissued Patent
Oren

(10) Patent Number: US RE46,645 E
(45) Date of Reissued Patent: Dec. 26, 2017

(54) TRAILER FOR PROPPANT CONTAINERS

(71) Applicant: Oren Technologies, LLC, Houston, TX (US)

(72) Inventor: Joshua Oren, Houston, TX (US)

(73) Assignee: OREN TECHNOLOGIES, LLC, Houston, TX (US)

(21) Appl. No.: 29/537,565

(22) Filed: Aug. 27, 2015

Related U.S. Patent Documents

Reissue of:
(64) Patent No.: Des. 688,597
Issued: Aug. 27, 2013
Appl. No.: 29/451,676
Filed: Apr. 5, 2013

(51) LOC (10) Cl. ..... 12-10
(52) U.S. Cl.
USPC ..... D12/101
(58) Field of Classification Search
USPC .... D12/93, 94, 95, 96, 97, 98, 99, 101, 102, D12/104, 105, 431, 433
(Continued)

(56) References Cited

U.S. PATENT DOCUMENTS 137,871 A 4/1873 Worsley
150,894 A 5/1874 Safely
(Continued)

FOREIGN PATENT DOCUMENTS

CA 2023138 2/1992
CA 2791088 3/2013
(Continued)

OTHER PUBLICATIONS

SandBox Logistics, LLC, screenshots from video dated Sep. 19, 2013.
(Continued)

*Primary Examiner* — Phillip S Hyder
(74) *Attorney, Agent, or Firm* — Hogan Lovells US LLP

(57) CLAIM

The ornamental design for a trailer for proppant containers, as shown and described.

DESCRIPTION

FIG. 1 is an upper perspective view of [the] *a* trailer for proppant containers [showing] *embodying* my new design.
FIG. 2 is a side elevation view [thereof] *of the embodiment of FIG. 1*;
FIG. 3 is an opposite side elevation view [thereof] *of the embodiment of FIG. 1*;
FIG. 4 is a front elevation view [thereof] *of the embodiment of FIG. 1*;
FIG. 5 is a rear elevation view [thereof] *of the embodiment of FIG. 1*;
FIG. 6 is a top plan view [thereof] *of the embodiment of FIG. 1*; and,
FIG. 7 is a bottom plan view [thereof] *of the embodiment of FIG. 1*.
[The features presented in broken lines are for environmental purposes only and form no part of the claimed design.] *The broken lines depict portions of the trailer for proppant containers in which the design is embodied that are not considered part of the claimed design.*

1 Claim, 3 Drawing Sheets

Matter enclosed in heavy brackets [ ] appears in the original patent but forms no part of this reissue; matter printed in italics indicates the additions made by reissue.

(58) Field of Classification Search
CPC ..... B62D 33/02; B62D 53/06; B62D 53/061; B62D 53/065; B62D 53/08; B62D 21/02; B62D 21/20; B60P 3/22; B60P 3/2215
See application file for complete search history.

(56) References Cited

U.S. PATENT DOCUMENTS

| | | | |
|---|---|---|---|
| 384,443 | A | 6/1888 | Hoover |
| 448,238 | A | 3/1891 | Johnson |
| 711,632 | A | 10/1902 | Johnson |
| 917,649 | A | 4/1909 | Otto |
| 1,143,641 | A | 6/1915 | McGregor |
| 1,331,883 | A | 2/1920 | Stuart |
| 1,344,768 | A | 6/1920 | Messiter |
| 1,434,488 | A | 11/1922 | Forsythe et al. |
| 1,520,560 | A | 12/1923 | Burno |
| 1,506,936 | A | 9/1924 | Lea |
| 1,526,527 | A | 2/1925 | Butler |
| 1,573,664 | A | 2/1926 | Wetherill |
| 1,807,447 | A | 5/1931 | Smith |
| 1,850,000 | A | 3/1932 | Fernand |
| 1,932,320 | A | 10/1933 | Steward |
| 1,973,312 | A | 9/1934 | Hardinge |
| 2,020,628 | A | 11/1935 | Woodruff |
| 2,233,005 | A | 2/1941 | Garlinghouse |
| 2,255,448 | A | 9/1941 | Morris |
| 2,293,160 | A | 8/1942 | Miller et al. |
| 2,368,672 | A | 2/1945 | McNamara |
| 2,381,103 | A | 8/1945 | Frank |
| 2,385,245 | A | 9/1945 | Willoughby |
| 2,423,879 | A | 7/1947 | De Frees |
| 2,564,020 | A | 8/1951 | Mengel |
| 2,603,342 | A | 7/1952 | Martinson |
| 2,616,758 | A | 11/1952 | Meyers |
| 2,622,771 | A | 12/1952 | Tulou |
| 2,652,174 | A | 9/1953 | Shea et al. |
| 2,670,866 | A | 3/1954 | Glesby |
| 2,678,145 | A | 5/1954 | Ejuzwiak et al. |
| 2,693,282 | A | 11/1954 | Sensibar |
| 2,700,574 | A | 1/1955 | Tourneau |
| 2,792,262 | A | 4/1955 | Hathorn |
| 2,774,515 | A | 12/1956 | Johansson et al. |
| 2,791,973 | A | 5/1957 | Dorey |
| 2,801,125 | A | 7/1957 | Page et al. |
| 2,808,164 | A | 10/1957 | Glendinning |
| 2,812,970 | A | 11/1957 | Martinson |
| 2,837,369 | A | 6/1958 | Stopps |
| 2,865,521 | A | 12/1958 | Fisher et al. |
| 2,873,036 | A | 2/1959 | Noble |
| 2,894,666 | A | 7/1959 | Campbell, Jr. |
| 2,988,235 | A | 6/1961 | Ronyak |
| 2,994,460 | A | 8/1961 | Matthews |
| 3,041,113 | A | 6/1962 | Sackett |
| 3,049,248 | A | 8/1962 | Heltzel et al. |
| 3,064,832 | A | 11/1962 | Heltzel |
| 3,083,879 | A | 4/1963 | Coleman |
| 3,090,527 | A | 5/1963 | Rensch |
| 3,109,389 | A | 11/1963 | Karlsson |
| 3,122,258 | A | 2/1964 | Raymond |
| 3,135,432 | A | 6/1964 | McKinney |
| 3,163,127 | A | 12/1964 | Gutridge et al. |
| 3,187,684 | A | 6/1965 | Ortner |
| 3,198,494 | A | 8/1965 | Curran et al. |
| 3,199,585 | A | 8/1965 | Cronberger |
| 3,248,026 | A | 4/1966 | Kemp |
| 3,255,927 | A | 6/1966 | Ruppert et al. |
| 3,265,443 | A | 8/1966 | Simas |
| 3,270,921 | A | 9/1966 | Nadolske et al. |
| 3,281,006 | A | 10/1966 | Tohchung |
| 3,294,306 | A | 12/1966 | Areddy |
| 3,318,473 | A | 5/1967 | Jones et al. |
| 3,353,599 | A | 11/1967 | Swift |
| 3,354,918 | A | 11/1967 | Coleman |
| 3,378,152 | A | 4/1968 | Warner |
| 3,387,570 | A | 6/1968 | Pulcrano et al. |
| 3,396,675 | A | 8/1968 | Stevens |
| 3,397,654 | A | 8/1968 | Snyder |
| 3,406,995 | A | 10/1968 | McCarthy |
| 3,407,971 | A | 10/1968 | Oehler |
| 3,425,599 | A | 2/1969 | Sammarco et al. |
| 3,455,474 | A | 7/1969 | Truncali |
| 3,499,694 | A | 3/1970 | Coppel |
| 3,508,762 | A | 4/1970 | Pratt |
| 3,524,567 | A | 8/1970 | Coleman |
| 3,528,570 | A | 9/1970 | Pase |
| 3,561,633 | A | 2/1971 | Morrison et al. |
| 3,587,834 | A | 6/1971 | Dugge |
| 3,596,609 | A | 8/1971 | Ortner |
| 3,601,244 | A | 8/1971 | Ort et al. |
| 3,602,400 | A | 8/1971 | Cooke |
| 3,650,567 | A | 3/1972 | Danielson |
| 3,653,521 | A | 4/1972 | Bridge |
| 3,661,293 | A | 5/1972 | Gerhard et al. |
| 3,692,363 | A | 9/1972 | Tenebaum et al. |
| 3,704,797 | A | 12/1972 | Suykens |
| 3,721,199 | A | 3/1973 | Hassenauer |
| 3,729,121 | A | 4/1973 | Cannon |
| 3,734,215 | A | 5/1973 | Smith |
| 3,738,511 | A | 6/1973 | Lemon et al. |
| 3,752,511 | A | 8/1973 | Racy |
| 3,777,909 | A | 12/1973 | Rheinfrank |
| 3,785,534 | A | 1/1974 | Smith |
| 3,800,712 | A | 4/1974 | Krug, Jr. |
| 3,802,584 | A | 4/1974 | Sackett |
| 3,817,261 | A | 6/1974 | Rogge |
| 3,820,762 | A | 6/1974 | Bostrom et al. |
| 3,827,578 | A | 8/1974 | Hough |
| 3,840,141 | A | 10/1974 | Allom et al. |
| 3,854,612 | A | 12/1974 | Snape |
| 3,861,716 | A | 1/1975 | Baxter et al. |
| 3,883,005 | A | 5/1975 | Stevens |
| 3,909,223 | A | 9/1975 | Schmidt |
| 3,933,100 | A | 1/1976 | Dugge |
| 3,963,149 | A | 6/1976 | Fassauer |
| 3,970,123 | A | 7/1976 | Poulton et al. |
| 3,986,708 | A | 10/1976 | Hellzel et al. |
| 3,997,089 | A | 12/1976 | Clarke et al. |
| 4,003,301 | A | 1/1977 | Norton |
| 4,004,700 | A | 1/1977 | Empey |
| 4,057,153 | A | 11/1977 | Weaver |
| 4,058,239 | A | 11/1977 | Van Mill |
| 4,063,656 | A | 12/1977 | Lambert |
| 4,073,410 | A | 2/1978 | Melcher |
| 4,125,195 | A | 11/1978 | Sasadi |
| 4,138,163 | A | 2/1979 | Calvert et al. |
| 4,178,117 | A | 12/1979 | Brugler |
| 4,204,773 | A | 5/1980 | Bates |
| 4,210,273 | A | 7/1980 | Hegele |
| 4,210,963 | A | 7/1980 | Ricciardi et al. |
| RE30,358 | E | 8/1980 | Sensibar |
| 4,222,498 | A | 9/1980 | Brock |
| 4,227,732 | A | 10/1980 | Kish |
| 4,232,884 | A | 11/1980 | DeWitt |
| 4,239,424 | A | 12/1980 | Pavolka |
| 4,245,820 | A | 1/1981 | Muryn |
| 4,247,228 | A | 1/1981 | Gray et al. |
| 4,247,370 | A | 1/1981 | Nijhawan et al. |
| 4,258,953 | A | 3/1981 | Johnson |
| 4,265,266 | A | 5/1981 | Kierbow et al. |
| 4,278,190 | A | 7/1981 | Oory et al. |
| 4,282,988 | A | 8/1981 | Hulbert, Jr. |
| 4,287,921 | A | 9/1981 | Sanford |
| 4,287,997 | A | 9/1981 | Rolfe et al. |
| 4,289,353 | A | 9/1981 | Merritt |
| 4,299,597 | A | 11/1981 | Oetiker et al. |
| 4,306,895 | A | 12/1981 | Thompson et al. |
| 4,329,106 | A | 5/1982 | Adler |
| 4,350,241 | A | 9/1982 | Wenzel |
| 4,359,176 | A | 11/1982 | Johnson |
| 4,363,396 | A | 12/1982 | Wolf et al. |
| 4,397,406 | A | 8/1983 | Croley |
| 4,398,653 | A | 8/1983 | Daloisio |
| 4,402,392 | A | 9/1983 | Fabian et al. |
| 4,407,202 | A | 10/1983 | McCormick |

(56) References Cited

U.S. PATENT DOCUMENTS 4,408,886 A 10/1983 Sampson et al.
4,410,106 A 10/1983 Kierbow et al.
4,420,285 A 12/1983 Loyer et al.
4,427,133 A 1/1984 Kierbow et al.
4,428,504 A 1/1984 Bassett et al.
4,449,861 A 5/1984 Saito et al.
4,453,645 A 6/1984 Usui et al.
4,474,204 A 10/1984 West
4,475,672 A 10/1984 Whitehead
4,478,155 A 10/1984 Cena et al.
4,483,462 A 11/1984 Heintz
4,525,071 A 6/1985 Horowitz
4,526,353 A 7/1985 Stomp
4,532,098 A 7/1985 Campbell
4,552,573 A 11/1985 Weis
4,569,394 A 2/1986 Sweatman et al.
4,571,143 A 2/1986 Hellerich
4,608,931 A 9/1986 Ruhmann et al.
4,619,531 A 10/1986 Dunstan
4,624,729 A 11/1986 Bresciani et al.
4,626,155 A 12/1986 Hlinsky et al.
4,626,166 A 12/1986 Jolly
4,628,825 A 12/1986 Taylor et al.
4,660,733 A 4/1987 Snyder et al.
4,701,095 A 10/1987 Berryman et al.
4,715,754 A 12/1987 Scully
4,738,774 A 4/1988 Patrick
4,741,273 A 5/1988 Sherwood
4,801,389 A 1/1989 Brannon et al.
4,819,830 A 4/1989 Schultz
4,836,735 A 6/1989 Dennehy
4,848,605 A 7/1989 Wise
4,882,784 A 11/1989 Tump
4,889,219 A 12/1989 Key
4,901,649 A 2/1990 Fehrenbach et al.
4,909,378 A 3/1990 Webb
4,909,556 A 3/1990 Koskinen
4,917,019 A 4/1990 Hesch et al.
4,919,583 A 4/1990 Speakman, Jr.
4,923,358 A 5/1990 Van Mill
4,946,068 A 8/1990 Erickson et al.
4,947,760 A 8/1990 Dawson et al.
4,954,975 A 9/1990 Kalata
4,956,821 A 9/1990 Fenelon
4,964,243 A 10/1990 Reiter
4,969,659 A * 11/1990 Ehrlich ..... B62D 53/067 280/407.1
4,975,205 A 12/1990 Sloan
4,995,522 A 2/1991 Barr
5,004,400 A 4/1991 Handke
5,042,538 A 8/1991 Wiese
5,069,352 A 12/1991 Harbolt et al.
5,080,259 A 1/1992 Hadley
5,082,304 A 1/1992 Preller
5,102,281 A 4/1992 Handke
5,102,286 A 4/1992 Fenton
5,105,858 A 4/1992 Levinson
5,131,524 A 7/1992 Uehara
5,183,371 A * 2/1993 O'Daniel ..... B60P 1/6427 280/656
5,190,182 A 3/1993 Copas et al.
5,195,861 A 3/1993 Handke
5,199,826 A 4/1993 Lawrence
5,201,546 A 4/1993 Lindsay
5,224,635 A 7/1993 Wise
5,253,746 A 10/1993 Friesen et al.
5,253,776 A 10/1993 Decroix et al.
5,265,763 A 11/1993 Heinrici et al.
5,286,158 A 2/1994 Zimmerman
5,290,139 A 3/1994 Hedrick
5,317,783 A 6/1994 Williamson
5,320,046 A 6/1994 Hesch
5,324,097 A 6/1994 DeCap
5,339,996 A 8/1994 Dubbert
5,345,982 A 9/1994 Nadeau et al.
5,358,137 A 10/1994 Shuert et al.
5,373,792 A 12/1994 Pileggi et al.
5,392,946 A 2/1995 Holbrook et al.
5,402,915 A 4/1995 Hogan
5,413,154 A 5/1995 Hurst et al.
5,429,259 A 7/1995 Robin
5,441,321 A 8/1995 Karpisek
5,445,289 A 8/1995 Owen
5,465,829 A 11/1995 Kruse
5,470,175 A 11/1995 Jensen et al.
5,470,176 A 11/1995 Corcoran et al.
5,493,852 A 2/1996 Stewart
5,507,514 A 4/1996 Jacques
5,538,286 A 7/1996 Hoff
5,549,278 A 8/1996 Sidler
5,564,599 A 10/1996 Barber et al.
5,570,743 A 11/1996 Padgett et al.
5,590,976 A 1/1997 Kilheffer et al.
5,601,181 A 2/1997 Lindhorst
5,602,761 A 2/1997 Spoerre et al.
5,613,446 A 3/1997 DiLuigi et al.
5,617,974 A 4/1997 Sawyer
5,647,514 A 7/1997 Toth et al.
RE35,580 E 8/1997 Heider et al.
5,667,298 A 9/1997 Musil
5,687,881 A 11/1997 Rouse et al.
5,690,466 A 11/1997 Gaddis et al.
5,697,535 A 12/1997 Coleman
5,706,614 A 1/1998 Wiley et al.
5,718,555 A 2/1998 Swalheim
5,722,552 A 3/1998 Olson
5,722,688 A 3/1998 Garcia
5,746,258 A 5/1998 Huck
5,761,854 A 6/1998 Johnson et al.
5,762,222 A 6/1998 Liu
5,772,390 A 6/1998 Walker
5,782,524 A 7/1998 Heider et al.
5,785,421 A 7/1998 Milek
5,803,296 A 9/1998 Olson
5,806,863 A 9/1998 Heger et al.
5,836,480 A 11/1998 Epp et al.
5,845,799 A 12/1998 Deaton
5,876,172 A 3/1999 Di Rosa
5,906,471 A 5/1999 Schwoerer
5,911,337 A 6/1999 Bedeker
5,927,558 A 7/1999 Bruce
5,960,974 A 10/1999 Kee
5,971,219 A 10/1999 Karpisek
5,993,202 A 11/1999 Yamazaki et al.
5,997,099 A 12/1999 Collins
6,002,063 A 12/1999 Bilak et al.
6,006,918 A 12/1999 Hart
D418,451 S * 1/2000 Konecheck ..... D12/101
6,069,118 A 5/2000 Hinkel et al.
6,077,068 A 6/2000 Okumura
6,092,974 A 7/2000 Roth
6,109,486 A 8/2000 Lee
6,120,233 A 9/2000 Adam
D431,358 S 10/2000 Willemsen
6,155,175 A 12/2000 Rude et al.
6,186,654 B1 2/2001 Gunteret et al.
6,190,107 B1 2/2001 Lanigan et al.
6,192,985 B1 2/2001 Hinkel et al.
6,196,590 B1 3/2001 Kim
6,205,938 B1 3/2001 Foley et al.
6,247,594 B1 6/2001 Garton
6,263,803 B1 7/2001 Dohr et al.
6,269,849 B1 8/2001 Fields
6,273,154 B1 8/2001 Laug
6,283,212 B1 9/2001 Hinkel et al.
6,286,986 B2 9/2001 Grimland
6,296,109 B1 10/2001 Nohl
6,306,800 B1 10/2001 Samuel et al.
6,318,746 B1 * 11/2001 McCrory ..... B62D 53/00 280/411.1
6,328,156 B1 12/2001 Otsman
6,328,183 B1 12/2001 Coleman
6,364,584 B1 4/2002 Taylor
6,374,915 B1 4/2002 Andrews

(56) References Cited

U.S. PATENT DOCUMENTS 6,382,446 B1 5/2002 Hinkle et al.
6,390,742 B1 5/2002 Breeden
D459,287 S * 6/2002 Beard et al. ..... D12/406
6,401,983 B1 6/2002 McDonald et al.
6,412,422 B2 7/2002 Dohr et al.
6,415,909 B1 7/2002 Mitchell et al.
6,416,271 B1 7/2002 Pigott et al.
6,425,725 B1 7/2002 Ehlers
6,457,291 B2 10/2002 Wick
6,498,976 B1 12/2002 Ehlbeck et al.
6,505,760 B1 1/2003 Werner
6,508,387 B1 1/2003 Simon et al.
6,508,615 B2 1/2003 Taylor
6,523,482 B2 2/2003 Wingate
6,537,002 B2 3/2003 Gloystein
6,575,614 B2 6/2003 Tosco et al.
6,660,693 B2 12/2003 Miller et al.
6,663,373 B2 12/2003 Yoshida
6,666,573 B2 12/2003 Grassi
6,675,073 B2 1/2004 Kieman et al.
6,705,449 B2 3/2004 Wagstaffe
6,720,290 B2 4/2004 England et al.
6,772,912 B1 8/2004 Schall et al.
6,774,318 B2 8/2004 Beal et al.
6,776,235 B1 8/2004 England
6,783,032 B2 8/2004 Fons
6,811,048 B2 11/2004 Lau
6,828,280 B2 12/2004 England et al.
6,835,041 B1 12/2004 Albert
6,882,960 B2 4/2005 Miller
6,902,061 B1 6/2005 Elstone
6,915,854 B2 7/2005 England et al.
6,935,668 B1 * 8/2005 Summers ..... B60P 3/002 280/143
6,953,119 B1 10/2005 Wening
6,955,127 B2 10/2005 Taylor
6,964,551 B1 11/2005 Friesen
6,968,946 B2 11/2005 Shuert
6,974,021 B1 12/2005 Boevers
D513,717 S * 1/2006 Wittkowski ..... D12/101
7,008,163 B2 3/2006 Russell
7,051,661 B2 5/2006 Herzog et al.
D522,409 S * 6/2006 Wittkowski ..... D12/101
7,084,095 B2 8/2006 Lee et al.
7,104,425 B2 9/2006 Le Roy
7,140,516 B2 11/2006 Bothor
7,146,914 B2 12/2006 Morton et al.
7,201,290 B2 4/2007 Mehus et al.
7,214,028 B2 5/2007 Boasso
7,240,681 B2 7/2007 Saik
7,252,309 B2 8/2007 Eng Goh
7,284,579 B2 10/2007 Elgan et al.
7,284,670 B2 10/2007 Schmid
7,316,333 B2 1/2008 Wegner
7,367,271 B2 5/2008 Early
7,377,219 B2 5/2008 Brandt
D574,755 S * 8/2008 Thurm ..... D12/101
7,410,623 B2 8/2008 Mehus et al.
7,452,000 B2 * 11/2008 Winter et al. ..... 280/656
7,475,796 B2 1/2009 Garton
7,475,901 B2 * 1/2009 Winter et al. ..... 280/656
7,500,817 B2 3/2009 Furrer et al.
7,513,280 B2 4/2009 Brashears et al.
7,591,386 B2 9/2009 Hooper
7,640,075 B2 12/2009 Wietgrefe
7,651,117 B1 * 1/2010 McGee ..... 280/656
7,695,538 B2 4/2010 Cheng
7,753,637 B2 7/2010 Benedict et al.
7,798,558 B2 * 9/2010 Messier ..... B62D 25/2054 296/184.1
7,802,958 B2 9/2010 Garcia et al.
7,803,321 B2 9/2010 Lark et al.
7,837,427 B2 11/2010 Beckel
7,841,394 B2 11/2010 McNeel et al.
7,845,516 B2 12/2010 Pessin et al.
7,858,888 B2 12/2010 Lucas et al.
7,867,613 B2 1/2011 Smith
7,891,304 B2 2/2011 Herzog et al.
7,891,523 B2 2/2011 Mehus et al.
7,896,198 B2 3/2011 Mehus et al.
7,921,783 B2 4/2011 Forbes et al.
7,967,161 B2 6/2011 Townsend
7,980,803 B2 7/2011 Brandstätter et al.
7,997,623 B2 8/2011 Williams
8,083,083 B1 12/2011 Mohns
D660,748 S * 5/2012 Cooley ..... D12/101
8,201,520 B2 6/2012 Meritt
8,313,278 B2 11/2012 Simmons et al.
8,366,349 B2 2/2013 Beachner
8,375,690 B2 2/2013 LaFargue et al.
8,379,927 B2 2/2013 Taylor
8,387,824 B2 3/2013 Wietgrefe
8,393,502 B2 3/2013 Renyer et al.
8,424,666 B2 4/2013 Berning et al.
D688,351 S 8/2013 Oren
8,505,780 B2 8/2013 Oren
8,544,419 B1 10/2013 Spalding et al.
8,545,148 B2 10/2013 Wanek-Pusset et al.
8,562,022 B2 10/2013 Nadeau et al.
8,573,387 B2 11/2013 Trimble
8,573,917 B2 11/2013 Renyer
8,585,341 B1 11/2013 Oren
D694,670 S * 12/2013 Oren ..... D12/101
8,616,370 B2 12/2013 Allegretti
8,622,251 B2 1/2014 Oren
8,636,832 B2 1/2014 Stutzman et al.
8,646,641 B2 2/2014 Moir
8,668,430 B2 3/2014 Oren
D703,582 S 4/2014 Oren
8,820,559 B2 9/2014 Beitler et al.
8,827,118 B2 9/2014 Oren
8,887,914 B2 11/2014 Allegretti
8,905,266 B2 12/2014 De Brabanter
8,915,691 B2 12/2014 Mintz
9,051,801 B1 6/2015 Mintz
9,052,034 B1 6/2015 Wegner et al.
D740,556 S 10/2015 Huber
9,162,261 B1 10/2015 Smith
9,267,266 B2 2/2016 Cutler et al.
9,309,064 B2 4/2016 Sheesley
D780,883 S 3/2017 Schaffner et al.
D783,771 S 4/2017 Stegemoeller et al.
D783,772 S 4/2017 Stegemoeller, III et al.
9,656,701 B2 * 5/2017 Booher ..... B62D 53/061
2001/0022308 A1 9/2001 Epp et al.
2001/0045338 A1 11/2001 Ransil et al.
2002/0134550 A1 9/2002 Leeson et al.
2002/0139643 A1 10/2002 Peltier et al.
2003/0006248 A1 1/2003 Gill et al.
2003/0062707 A1 * 4/2003 Koch ..... 280/401
2003/0111470 A1 6/2003 Fouillet et al.
2003/0145418 A1 8/2003 Ikeda et al.
2003/0156929 A1 8/2003 Russell
2004/0065699 A1 4/2004 Schoer et al.
2004/0074922 A1 4/2004 Bother et al.
2004/0084874 A1 5/2004 McDougall et al.
2004/0206646 A1 10/2004 Goh
2004/0245284 A1 12/2004 Mehus et al.
2005/0093273 A1 * 5/2005 McDonell ..... 280/656
2005/0158158 A1 7/2005 Porta
2005/0201851 A1 9/2005 Jonkka
2006/0012183 A1 1/2006 Marchiori et al.
2006/0027582 A1 2/2006 Beach
2006/0053582 A1 3/2006 Engel et al.
2006/0091072 A1 5/2006 Schmid et al.
2006/0151058 A1 7/2006 Salaoras et al.
2006/0180062 A1 8/2006 Furrer et al.
2006/0180232 A1 8/2006 Glewwe et al.
2006/0239806 A1 10/2006 Yelton
2006/0267377 A1 11/2006 Lusk et al.
2006/0277783 A1 12/2006 Garton
2006/0289166 A1 * 12/2006 Stromquist ..... E21B 43/267 166/305.1
2007/0096537 A1 5/2007 Hicks

(56) References Cited

U.S. PATENT DOCUMENTS

| | | | | |
|---|---|---|---|---|
| 2007/0125543 | A1 | 6/2007 | McNeel et al. | |
| 2008/0008562 | A1 | 1/2008 | Beckel et al. | |
| 2008/0017905 | A1 | 1/2008 | Eppich | |
| 2008/0029546 | A1 | 2/2008 | Schuld | |
| 2008/0029553 | A1 | 2/2008 | Culleton | |
| 2008/0058228 | A1 | 3/2008 | Wilson | |
| 2008/0179054 | A1 | 7/2008 | McGough et al. | |
| 2008/0179324 | A1 | 7/2008 | McGough et al. | |
| 2008/0213073 | A1 | 9/2008 | Benedict et al. | |
| 2008/0226434 | A1 | 9/2008 | Smith et al. | |
| 2008/0264641 | A1 | 10/2008 | Slabaugh et al. | |
| 2008/0277423 | A1 | 11/2008 | Garton | |
| 2008/0303312 | A1* | 12/2008 | Smith | B62D 21/02 296/183.2 |
| 2009/0038242 | A1 | 2/2009 | Cope | |
| 2009/0078410 | A1 | 3/2009 | Krenek et al. | |
| 2009/0278326 | A1 | 11/2009 | Rowland et al. | |
| 2010/0021258 | A1 | 1/2010 | Kim | |
| 2010/0037572 | A1 | 2/2010 | Cheng | |
| 2010/0038143 | A1 | 2/2010 | Burnett et al. | |
| 2010/0040446 | A1 | 2/2010 | Renyer | |
| 2010/0065466 | A1 | 3/2010 | Perkins | |
| 2010/0108711 | A1 | 5/2010 | Wietgrefe | |
| 2010/0129193 | A1 | 5/2010 | Sherrer | |
| 2010/0199668 | A1 | 8/2010 | Coustou et al. | |
| 2010/0278621 | A1 | 11/2010 | Redekop | |
| 2010/0288603 | A1 | 11/2010 | Schafer | |
| 2010/0320727 | A1 | 12/2010 | Haut et al. | |
| 2011/0011893 | A1 | 1/2011 | Cerny | |
| 2011/0017693 | A1 | 1/2011 | Thomas | |
| 2011/0101040 | A1 | 5/2011 | Weissbrod | |
| 2011/0109703 | A1 | 5/2011 | Williams | |
| 2011/0127178 | A1 | 6/2011 | Claussen | |
| 2011/0160104 | A1 | 6/2011 | Wu et al. | |
| 2011/0162838 | A1 | 7/2011 | Mackenzie et al. | |
| 2011/0168593 | A1 | 7/2011 | Neufeld et al. | |
| 2011/0222983 | A1 | 9/2011 | Dugic et al. | |
| 2011/0297702 | A1 | 12/2011 | Hildebrandt et al. | |
| 2012/0103848 | A1 | 5/2012 | Allegretti et al. | |
| 2012/0181781 | A1* | 7/2012 | Gaussin | B62D 21/12 280/800 |
| 2012/0219391 | A1 | 8/2012 | Teichrob et al. | |
| 2012/0255539 | A1 | 10/2012 | Kolecki | |
| 2013/0004272 | A1 | 1/2013 | Mintz | |
| 2013/0022441 | A1 | 1/2013 | Uhryn et al. | |
| 2013/0206415 | A1 | 8/2013 | Sheesley | |
| 2013/0209204 | A1 | 8/2013 | Sheesley | |
| 2013/0233545 | A1 | 9/2013 | Mahoney | |
| 2013/0284729 | A1 | 10/2013 | Cook et al. | |
| 2013/0309052 | A1 | 11/2013 | Luharuka | |
| 2013/0323005 | A1 | 12/2013 | Rexius et al. | |
| 2014/0020765 | A1* | 1/2014 | Oren | B65D 88/30 137/1 |
| 2014/0020892 | A1 | 1/2014 | Oren | |
| 2014/0023465 | A1 | 1/2014 | Oren et al. | |
| 2014/0034662 | A1 | 2/2014 | Chalmers et al. | |
| 2014/0044507 | A1 | 2/2014 | Naizer et al. | |
| 2014/0083554 | A1 | 3/2014 | Harris | |
| 2014/0093319 | A1 | 4/2014 | Harris et al. | |
| 2014/0097182 | A1 | 4/2014 | Sheesley | |
| 2014/0166647 | A1 | 6/2014 | Sheesley | |
| 2014/0203046 | A1 | 7/2014 | Allegretti | |
| 2014/0234059 | A1 | 8/2014 | Thomeer | |
| 2014/0305769 | A1 | 10/2014 | Eiden et al. | |
| 2014/0321950 | A1 | 10/2014 | Krenek et al. | |
| 2015/0004895 | A1 | 1/2015 | Hammers et al. | |
| 2015/0069052 | A1 | 3/2015 | Allegretti et al. | |
| 2015/0086307 | A1 | 3/2015 | Stefan | |
| 2015/0110565 | A1 | 4/2015 | Harris | |
| 2015/0159232 | A1 | 6/2015 | Zucchi et al. | |
| 2015/0209829 | A1 | 7/2015 | De Siqueira et al. | |
| 2016/0148813 | A1 | 5/2016 | Rogers et al. | |
| 2016/0185522 | A1 | 6/2016 | Herman et al. | |
| 2016/0280480 | A1 | 9/2016 | Smith et al. | |
| 2017/0129721 | A1 | 5/2017 | Harris et al. | |

FOREIGN PATENT DOCUMENTS

| | | |
|---|---|---|
| CN | 201390486 | 1/2010 |
| CN | 201881469 | 6/2011 |
| CN | 103350017 | 10/2013 |
| DE | 3108121 | 9/1982 |
| DE | 3342281 | 6/1985 |
| DE | 4217329 | 5/1993 |
| EP | 0019967 | 12/1980 |
| EP | 322283 | 6/1989 |
| EP | 0564969 | 10/1993 |
| EP | 0997607 | 5/2000 |
| EP | 1052194 | 11/2000 |
| EP | 1167236 | 1/2002 |
| EP | 1775190 | 4/2007 |
| EP | 2062832 | 5/2009 |
| EP | 2311757 | 4/2011 |
| FR | 2173445 | 10/1973 |
| FR | 2640598 | 6/1990 |
| GB | 1296736 | 11/1972 |
| GB | 2374864 | 10/2002 |
| JP | S4871029 | 9/1973 |
| JP | S4876041 | 9/1973 |
| JP | S58161888 | 10/1983 |
| JP | 410087046 | 4/1998 |
| JP | 10264882 | 10/1998 |
| MX | 2012011046 | 5/2013 |
| WO | 1990008082 | 7/1990 |
| WO | 1992002437 | 2/1992 |
| WO | 1993001997 | 2/1993 |
| WO | 1993006031 | 4/1993 |
| WO | 1996025302 | 8/1996 |
| WO | 2006039757 | 4/2006 |
| WO | 2007005054 | 1/2007 |
| WO | 2007061310 | 5/2007 |
| WO | 2010026235 | 3/2010 |
| WO | 2011099358 | 8/2011 |
| WO | 2012021447 | 2/2012 |
| WO | 2012058059 | 5/2012 |

OTHER PUBLICATIONS

SandBox Logistics, LLC, screenshots from video dated Aug. 22, 2014.

SandBox Logistics, LLC, screenshots from video dated Oct. 11, 2013.

SandBox Logistics, LLC, screenshots from video dated Apr. 10, 2013.

Grit Energy Solutions, LLC, Fidelity, Screenshots from video dated May 16, 2014.

Grit Energy Solutions, LLC, Gate, Screenshots from video dated Dec. 6, 2013, https://www.youtube.com/user/gritstack.

Grit Energy Solutions, LLC, Screen, Screenshots from video dated Dec. 6, 2013, https://www.youtube.com/used/gritstack.

Grit Energy Solutions, LLC, The Grit Stack System—Live Frac, Screenshots from video dated Jun. 15, 2015, https://www.youtube.com/user/gritstack.

Grit Energy Solutions, LLC, The Grit Stack System, Screenshots from video dated Feb. 7, 2014, https://www.youtube.com/user/gritstack.

International Search Report for related International Application No. PCT/US2012/066639, dated Feb. 25, 2013.

International Search Report for related International Application No. PCT/US2013/035442, dated Jun. 23, 2013.

International Search Report for related International Application No. PCT/US2013/032819, dated May 23, 2013.

International Search Report for related International Application No. PCT/US2013/049028, dated Mar. 4, 2014.

International Preliminary Report on Patentability for PCT/US2012/066639, dated Feb. 26, 2013.

International Preliminary Report on Patentability for PCT/US2013/032819, dated Sep. 23, 2014.

International Search Report for PCT/US2015/012990, dated May 6, 2015. (15 pages).

(56) References Cited

OTHER PUBLICATIONS

FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for U.S. Appl. No. 61/538,616, Robert A. Harris, Sep. 23, 2011. (21 pages).
International Search Report for PCT/US2015/024810, dated Jul. 8, 2015. (13 pages).
European Search Report for Application No. 15167039.5, dated Sep. 8, 2015. (7 pages).
SandBox Logistics, "Mine to Wellhead Logistics," Houston, TX, May 2013.
SandBox Logistics, screenshots from video made in Apr. 2013 and publicly shown in May 2013, Arnegard, North Dakota.
PCT International Search Report for PCT/US15/49074, dated Dec. 17, 2015. (11 pages).
PCT International Search Report for PCT/US15/57601, dated May 6, 2016. (11 pages).
International Search Report for PCT/US15/35635, dated Oct. 30, 2015. (12 pages).
Non-Final Office Action dated Dec. 28, 2016 for co-pending U.S. Appl. No. 13/628,702.
Non-Final Office Action dated Jan. 13, 2017 for co-pending U.S. Appl. No. 14/923,920.
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.
Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S. Appl. No. 14/848,447.
Non-Final Office Action dated Dec. 9, 2016 for co-pending U.S. Appl. No. 14/927,614.
International Search Report for PCT Application No. PCT/US2016/050859 dated Dec. 9, 2016.
Non-Final Office Action dated Oct. 27, 2016 for co-pending U.S. Appl. No. 15/219,676.
Non-Final Office Action dated Nov. 9, 2016 for co-pending U.S. Appl. No. 14/948,494.
Final Office Action dated Nov. 4, 2016 for co-pending U.S. Appl. No. 14/738,485.
Arrows Up, Inc., Jumbo BTS—Bulk Transport System, Aug. 1, 2014.
Arrows Up, Inc., Reusable Packaging Association, Member Spotlight: John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield Infrastructure, Mobile Sand Silo System, 2016.
Final Office Action dated Sep. 27, 2016 for co-pending U.S. Appl. No. 13/555,635.
Non-Final Office Action dated Mar. 23, 2016 for co-pending U.S. Appl. No. 13/555,635.
Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.
Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. 14/831,924.
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.
Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.
Non-Final Office Action dated Oct. 6, 2015 for co-pending U.S. Appl. No. 13/660,855.
Final Office Action dated Aug. 6, 2015 for co-pending U.S. Appl. No. 13/660,855.
Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.
Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. Appl. No. 14/841,942.
Non-Final Office Action dated Nov. 30, 2015 for co-pending U.S. Appl. No. 14/841,942.
Non-Final Office Action dated Jul. 21, 2016 for co-pending U.S. Appl. No. 15/083,596.

(56) References Cited

OTHER PUBLICATIONS

Non-Final Office Action dated Aug. 19, 2016 for co-pending U.S. Appl. No. 15/084,613.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Aug. 25, 2016 for co-pending U.S. Appl. No. 14/927,614.
Non-Final Office Action dated Mar. 1, 2016 for co-pending U.S. Appl. No. 14/927,614.
Non-Final Office Action dated Apr. 29, 2016 for co-pending U.S. Appl. No. 14/943,182.
Final Office Action dated Sep. 15, 2016 for co-pending U.S. Appl. No. 14/882,973.
Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Final Office Action dated Nov. 11, 2015 for co-pending U.S. Appl. No. 13/625,675.
Non-Final Office Action dated Mar. 11, 2015 for co-pending U.S. Appl. No. 13/625,675.
Non-Final Office Action dated Jul. 26, 2017 for co-pending U.S. Appl. No. 15/463,201.
Final Office Action dated Jul. 27, 2017 for co-pending U.S. Appl. No. 14/738,485.
Non-Final Office Action dated Aug. 3, 2017 for co-pending U.S. Appl. No. 15/219,676.
Beckwith, Robin, Proppants: Where in the World, Proppant Shortage, JPT, Apr. 2011 (6 pages).
Kullman, John, The Complicated World of Proppant Selection . . . , South Dakota School of Mines & Technology, Oct. 2011 (65 pages).
Lafollette, Randy, Key Considerations for Hydraulic Fracturing of Gas Shales, BJ Services Company, Sep. 9, 2010 (53 pages).
WW Trailers Inc., Model GN2040EZ datasheet, Portland, OR, Jan. 2007 (4pages).
WW Trailers Inc., Model GN204S9A datasheet, Portland, OR, Jan. 2007 (4pages).
International Search Report and Written Opinion for PCT/US2017/012271, dated May 22, 2017.
Non-Final Office Action dated Apr. 24, 2017 for co-pending U.S. Appl. No. 14/738,485.
Final Office Action dated May 4, 2017 for co-pending U.S. Appl. No. 15/143,942.
Final Office Action dated May 30, 2017 for co-pending U.S. Appl. No. 13/625,675.
Final Office Action dated Apr. 19, 2017 for co-pending U.S. Appl. No. 15/219,640.
Non-Final Office Action dated Jun. 1, 2017 for co-pending U.S. Appl. No. 15/219,640.
Final Office Action dated May 2, 2017 for co-pending U.S. Appl. No. 15/219,676.
Non-Final Office Action dated May 10, 2017 for co-pending U.S. Appl. No. 14/882,973.
Non-Final Office Action dated Apr. 3, 2017 for co-pending U.S. Appl. No. 13/555,635.
Non-Final Office Action dated Feb. 14, 2017 for co-pending U.S. Appl. No. 14/943,111.
Final Office Action dated Mar. 7, 2017 for co-pending U.S. Appl. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Feb. 24, 2017 for co-pending U.S. Appl. No. 14/943,182.
Yergin, Daniel, The Quest: Energy, Security, and the Remaking of the Modern World, 2011.
Gold, Russell, The Boom: How Fracking Ignited the American Energy Revolution and Changed the World, 2014.
Yergin, Daniel, Stepping on the Gas, Wall Street Journal, Apr. 2, 2011.
Raimi, Daniel et al., Dunn County and Watford City, North Dakota: A case study of the fiscal effects of Bakken shale development, Duke University Energy Initiative, May 2016.
Local Economic Impacts Related to Marcellus Shale Development, The Center for Rural Pennyslvania, Sep. 2014.
Eagle Ford Shale Task Force Report, Railroad Commission of Texas, Convened and Chaired by David Porter, Mar. 2013.
*Sandbox Logistics LLC et al* v. *Grit Energy Solutions LLC,* 3:16-cv-00012, 73.Parties' P.R. 4-3 Joint Claim Construction and Prehearing Statement by Oren Technologies LLC, SandBox Enterprises LLC, SandBox Logistics LLC, Nov. 17, 2016.
Beard, Tim, Fracture Design in Horizontal Shale Wells—Data Gathering to Implementation, EPA Hydraulic Fracturing Workshop, Mar. 10-11, 2011.
Economic Impact of the Eagle Ford Shale, Center for Community and Business Research at the University of Texas at San Antonio's Institute for Economic Development, Sep. 2014.
Kelsey, Timothy W. et al., Economic Impacts of Marcellus Shale in Pennsylvania: Employment and Income in 2009, The Marcellus Shale Education & Training Center, Aug. 2011.
2006 Montana Commercial Vehicle Size and Weight and Safety Trucker's Handbook, Montana Department of Transportation Motor Carrier Services Division, Fifth Edition, Jun. 2010.
Budzynski, Brian W., Never Meant to Take the Weight, Roads & Bridges, Apr. 2015.
Interstate Weight Limits, 23 C.F.R. § 658, Apr. 1, 2011.
VIN Requirements, 49 C.F.R. § 565, Oct. 1, 2011.
Benson, Mary Ellen et al., Frac Sand in the United States—A Geological and Industry Overview, U.S. Department of the Interior, U.S. Geological Survey, 2015-2017.
Beekman, Thomas J. et al., Transportation Impacts of the Wisconsin Fracture Sand Industry, Wisconsin Department of Transportation, Mar. 2013.
U.S. Silica Company, Material Safety Data Sheet, Jan. 2011.
Texas Transportation Code, Chapter 621, General Provisions Relating to Vehicle Size and Weight (Sec. 621.101 effective Sep. 1, 2005 and Section 621.403 effective Sep. 1, 1995).
Garner, Dwight, Visions of an Age When Oil Isn't King, New York Times, Sep. 20, 2011.
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.

* cited by examiner

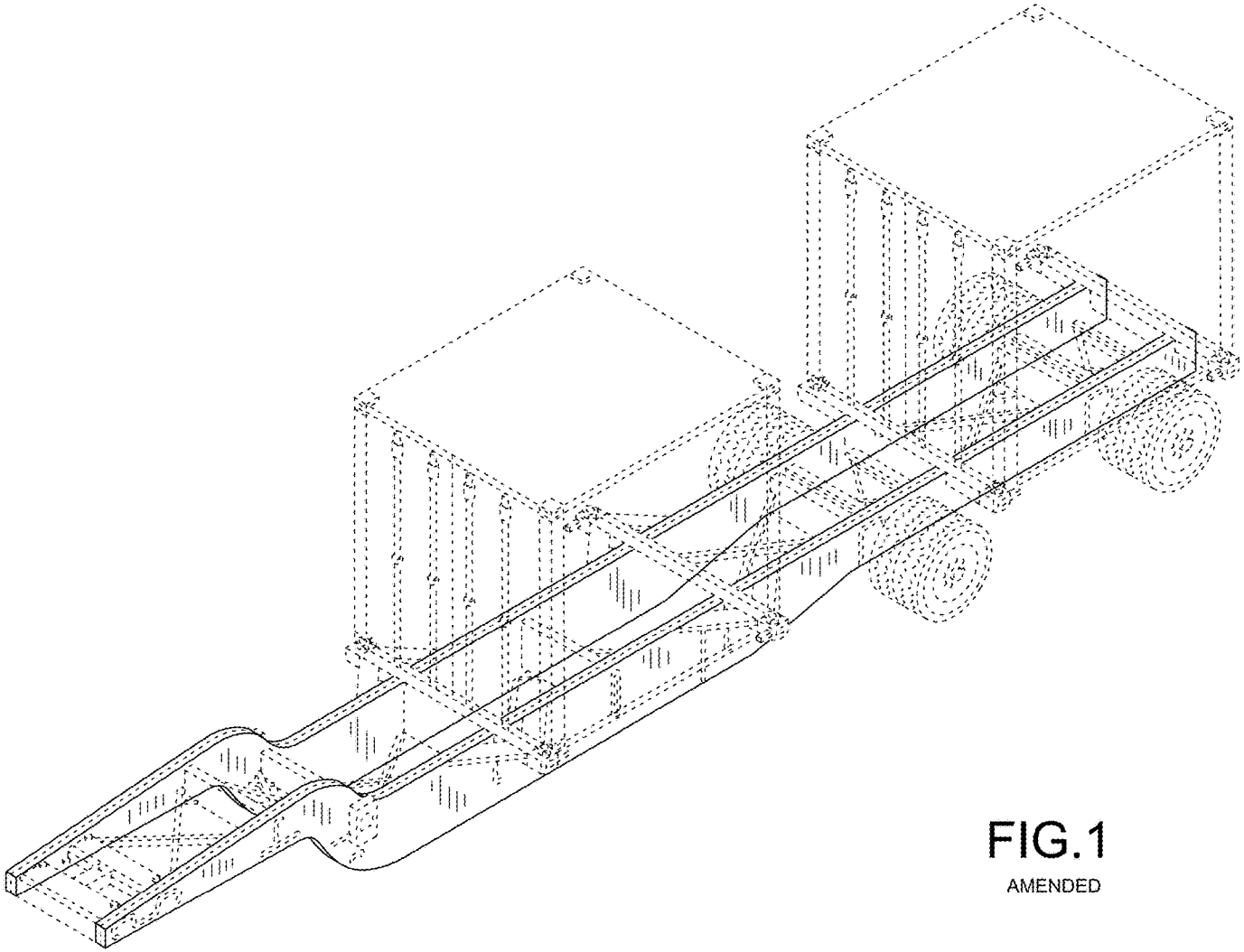
FIG.1
AMENDED

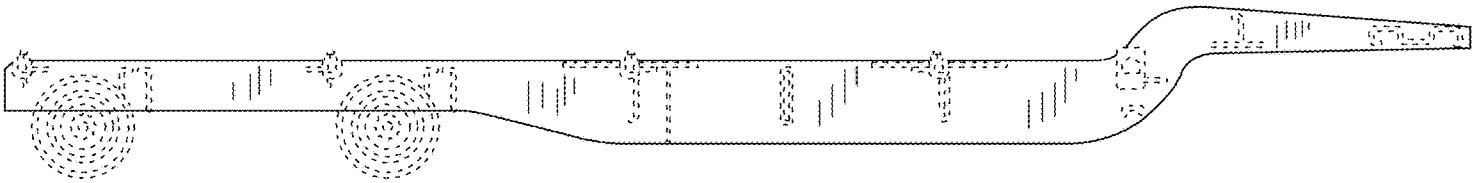
FIG.2
AMENDED
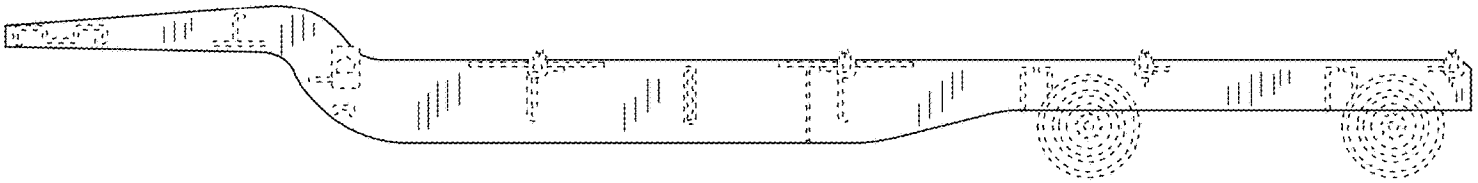
FIG.3
AMENDED
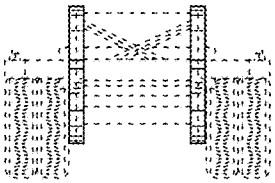
FIG.5
AMENDED
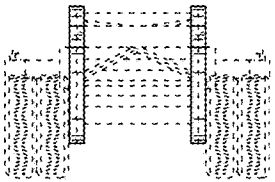
FIG.4
AMENDED

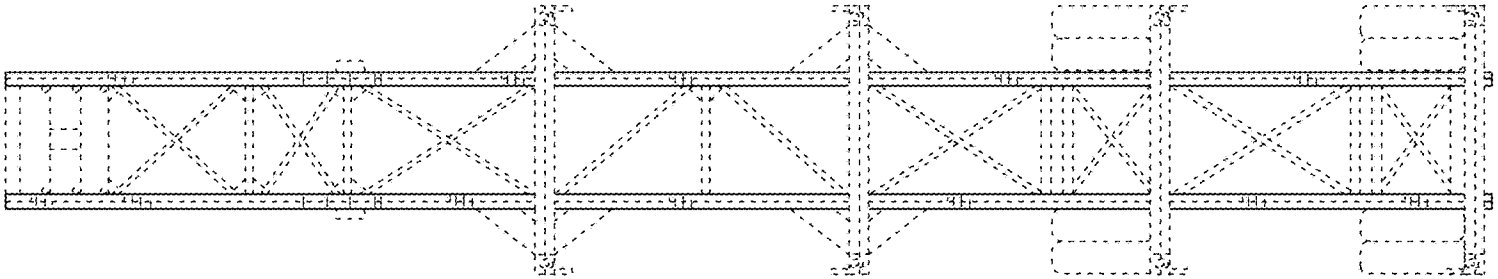
FIG.6
AMENDED
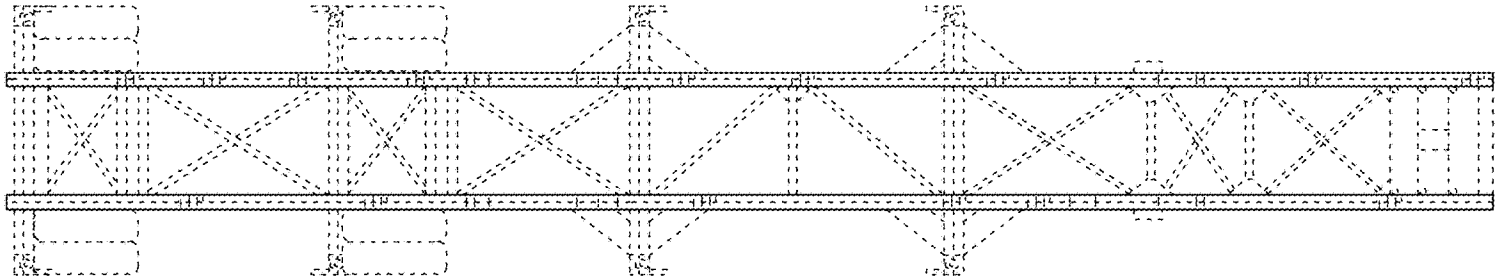
FIG.7
AMENDED